US010378918B2

(12) United States Patent
Thommen et al.

(10) Patent No.: US 10,378,918 B2
(45) Date of Patent: Aug. 13, 2019

(54) GENERATING ROUTES FROM LINES BASED ON ZOOM LEVELS

(71) Applicant: Microsoft Technology Licensing, LLC, Redmond, WA (US)

(72) Inventors: Simon Thommen, Sammamish, WA (US); Kenneth Douglas Smith, Renton, WA (US); Kshitij Sethi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 15/397,390

(22) Filed: Jan. 3, 2017

(65) Prior Publication Data
US 2018/0188063 A1    Jul. 5, 2018

(51) Int. Cl.
*G01C 21/36* (2006.01)
*G01C 21/34* (2006.01)
*G06F 3/0488* (2013.01)

(52) U.S. Cl.
CPC ..... *G01C 21/3664* (2013.01); *G01C 21/3461* (2013.01); *G01C 21/367* (2013.01); *G01C 21/3676* (2013.01); *G06F 3/0488* (2013.01)

(58) Field of Classification Search
CPC ............ G01C 21/3664; G01C 21/3453; G01C 21/3461; G01C 21/3676
See application file for complete search history.

(56) References Cited

U.S. PATENT DOCUMENTS

| 8,095,434 | B1 | 1/2012 | Puttick et al. |
| 8,676,489 | B2 | 3/2014 | Cheung et al. |
| 8,749,585 | B2 | 6/2014 | Kinnan et al. |
| 2004/0030493 | A1* | 2/2004 | Pechatnikov ......... G01C 21/26 701/411 |
| 2007/0143676 | A1 | 6/2007 | Chen |
| 2007/0260395 | A1* | 11/2007 | Matsuoka ......... G01C 21/3614 701/425 |

(Continued)

FOREIGN PATENT DOCUMENTS

| DE | 102012213357 A1 * | 1/2014 | ......... G01C 21/3461 |
| DE | 102012213357 A1 | 1/2014 | |

(Continued)

OTHER PUBLICATIONS

Pradeep, "Windows Maps updated with Inking support in Windows Store", https://mspoweruser.com/windows-maps-updated-with-inking-support-in-windows-store/, Published on: Aug. 3, 2016, 4 pages.

(Continued)

*Primary Examiner* — Dale Moyer
(74) *Attorney, Agent, or Firm* — Holzer Patel Drennan

(57) ABSTRACT

A user of a mapping application can use a user interface to draw a line between an origin address and a destination address on a map. The mapping application uses a zoom level associated with the map to determine if the user intended that the route consist mostly of highways or mostly of local roads. Segments of the line are replaced by similar road sections selected from the map based on the determined zoom level. The line replaced by the selected road sections is presented to the user as a route between the origin address and the destination address.

16 Claims, 19 Drawing Sheets

(56) References Cited

U.S. PATENT DOCUMENTS

| | | | |
|---|---|---|---|
| 2008/0027638 A1* | 1/2008 | Ando | G01C 21/3461 701/418 |
| 2008/0300781 A1* | 12/2008 | Sakai | G01C 21/367 701/533 |
| 2011/0022308 A1 | 1/2011 | Britton | |
| 2011/0153186 A1* | 6/2011 | Jakobson | G01C 21/20 701/532 |
| 2012/0029804 A1* | 2/2012 | White | G01C 21/20 701/455 |
| 2013/0211719 A1* | 8/2013 | Boschker | G01C 21/3484 701/533 |
| 2013/0328937 A1 | 12/2013 | Pirwani et al. | |
| 2014/0121966 A1* | 5/2014 | Iaccarino | G01C 21/00 701/533 |
| 2014/0229101 A1 | 8/2014 | Glaser et al. | |
| 2014/0372031 A1 | 12/2014 | Canner et al. | |
| 2015/0323339 A1* | 11/2015 | Yamaguchi | G01C 21/3605 701/533 |
| 2016/0102988 A1 | 4/2016 | Kalai et al. | |
| 2016/0209230 A1 | 7/2016 | Nagy et al. | |
| 2016/0291852 A1 | 10/2016 | Kim et al. | |
| 2017/0276505 A1* | 9/2017 | Duggan | G01C 21/367 |

FOREIGN PATENT DOCUMENTS

| | | | | |
|---|---|---|---|---|
| JP | 3397146 B2 | 4/2003 | | |
| WO | WO-2014067951 A1 * | 5/2014 | | G01C 21/34 |

OTHER PUBLICATIONS

Wang, et al., "Hierarchical route maps for efficient navigation", In Proceedings of the 19th international conference on Intelligent User Interfaces, Feb. 24, 2014, pp. 169-178.

"International Search Report and Written Opinion Issued in PCT Application No. PCT/US2017/068451", dated Apr. 6, 2018, 10 Pages.

* cited by examiner

900

GENERATING ROUTES FROM LINES BASED ON ZOOM LEVELS

BACKGROUND

Mapping applications have become invaluable tools for traveling. These applications are often integrated into smart phones, tablet computer, and in-vehicle navigation systems. Typically, a user of a mapping application enters an origin address and a destination address into the mapping application, and the mapping application presents the user with a route between the origin address and the destination address that the user can travel to reach the destination. Where the mapping application is part of a smart phone, or integrated into a vehicle, the mapping application may use a GPS (or other location sensor) to provide real-time directions to the user based on the route.

While such mapping applications are useful, there are several drawbacks associated with mapping applications. One such drawback is that they limit the ability of the user to customize the route that is presented for an origin address and a destination address. For example, a user traveling between an origin address such as New York and a destination address such as San Francisco, may desire a route that first travels down the east coast of the United States, heads west along the southern border to California, and then travels north to San Francisco along the Pacific Ocean. However, when the user enters New York and San Francisco into the mapping application, they are presented with the shortest route, rather than their desired route.

While some mapping applications allow the user to customize a route by adding "waypoints" or intermediate destinations, adding such intermediate locations can be time consuming, especially where the desired route differs significantly from the optimal or shortest route.

SUMMARY

A user of a mapping application can use a user interface to draw a line between an origin address and a destination address on a map that represents a route between the origin address and destination address that the user would like to travel. The mapping application uses a zoom level associated with the map to determine if the user intended that the route consist mostly of highway type roads or mostly of local roads. Where the zoom level indicates that the user is zoomed out, the user may have intended that the route consist mostly of highways. Similarly, where the zoom level indicates that the user is zoomed in, the user may have intended that the route consist mostly of local roads. Segments of the line are replaced by similar road sections selected from the map based on the determined zoom level. The line replaced by the selected road sections is presented to the user as a route between the origin address and the destination address.

In an implementation, a system for automatically selecting road sections for a line on a map based on a zoom level is provided. The system includes at least one computing device and a route engine. The route engine may be adapted to: receive a map comprising a plurality of road sections, wherein each road section is associated with a zoom level of a plurality of zoom levels; determine a zoom level of the plurality of zoom levels that is associated with the received map; receive a line, wherein the line has a placement on the map, and further wherein the line comprises an origin address and a destination address on the map; and based on the placement of the line on the map, select a subset of the plurality of road sections that forms a route between the origin address and the destination address, wherein each road section of the subset of the plurality of road sections is associated with the determined zoom level that is associated with the map.

In an implementation, a system for automatically selecting road sections for a line on a map based on a zoom level is provided. The system may include at least one computing device and a route engine. The route engine may be adapted to: receive a map comprising a plurality of road sections, wherein each road section is associated with a zoom level of a plurality of zoom levels; receive a selection of a zoom level of the plurality of zoom levels for the received map; receive a first segment of a line on the map, wherein the first segment has a placement on the map; and based on the placement of the first segment on the map, select a road section of the plurality of road sections that is similar to the first segment, wherein the selected road section of the subset of the plurality of road sections is associated with the selected zoom level.

In an implementation, a method for automatically selecting road sections for a line on a map based on a zoom level is provided. The method may include: receiving a map comprising a plurality of road sections by a computing device, wherein each road section is associated with a zoom level of a plurality of zoom levels; receiving a selection of a zoom level of the plurality of zoom levels for the received map by the computing device; receiving a line by the computing device, wherein the line has a placement on the map, and wherein the line comprises an origin address and a destination address on the map; based on the placement of the line on the map, selecting a subset of the plurality of road sections that forms a route between the origin address and the destination address by the computing device, wherein each road section of the subset of the plurality of road sections is associated with the selected zoom level for the received map; and replacing the line with the route formed by the selected subset of the plurality of road sections by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
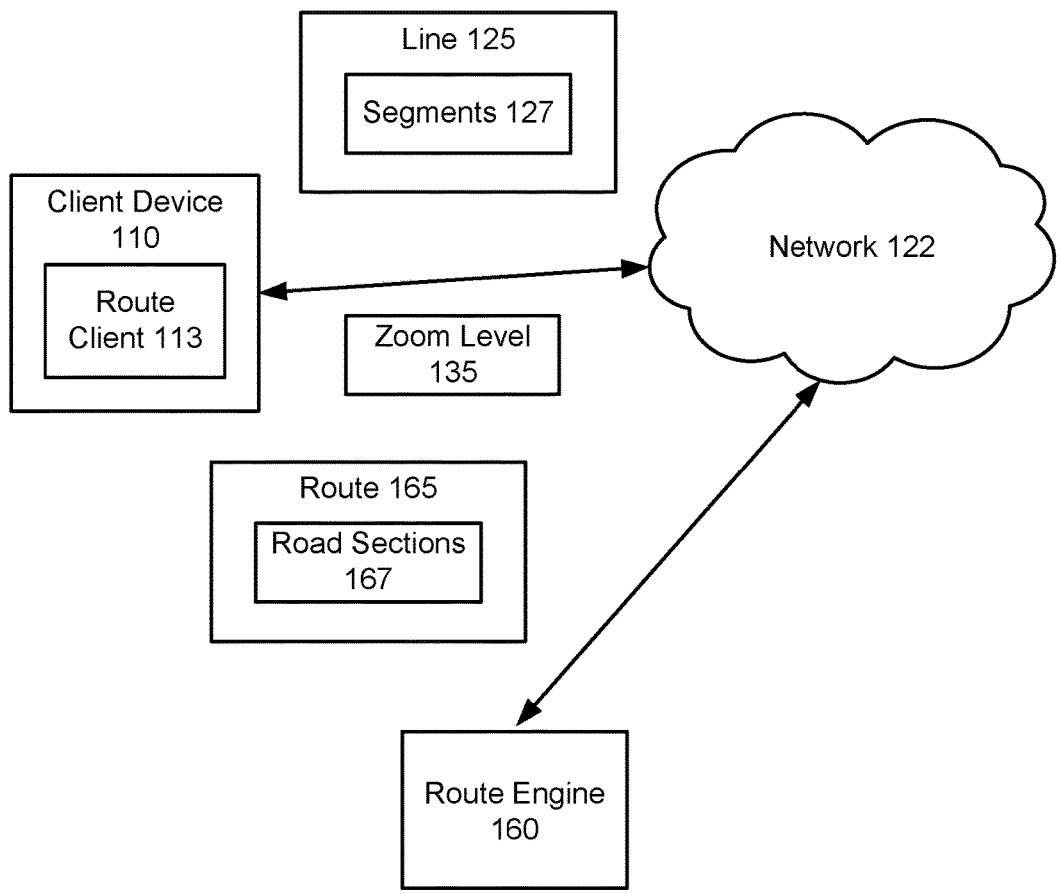
FIG. 1 is an illustration of an exemplary environment for generating routes based on lines.

FIG. 1 is an illustration of an exemplary environment 100 for generating routes 165 based on lines 125. The environment 100 may include a route engine 160 and a client device 110 in communication through a network 122. The network 122 may be a variety of network types including the public switched telephone network (PSTN), a cellular telephone network, and a packet switched network (e.g., the Internet). Although only one client device 110 and one route engine 160 are shown in FIG. 1, there is no limit to the number of client devices 110 and route engines 160 that may be supported.

Figure 19:
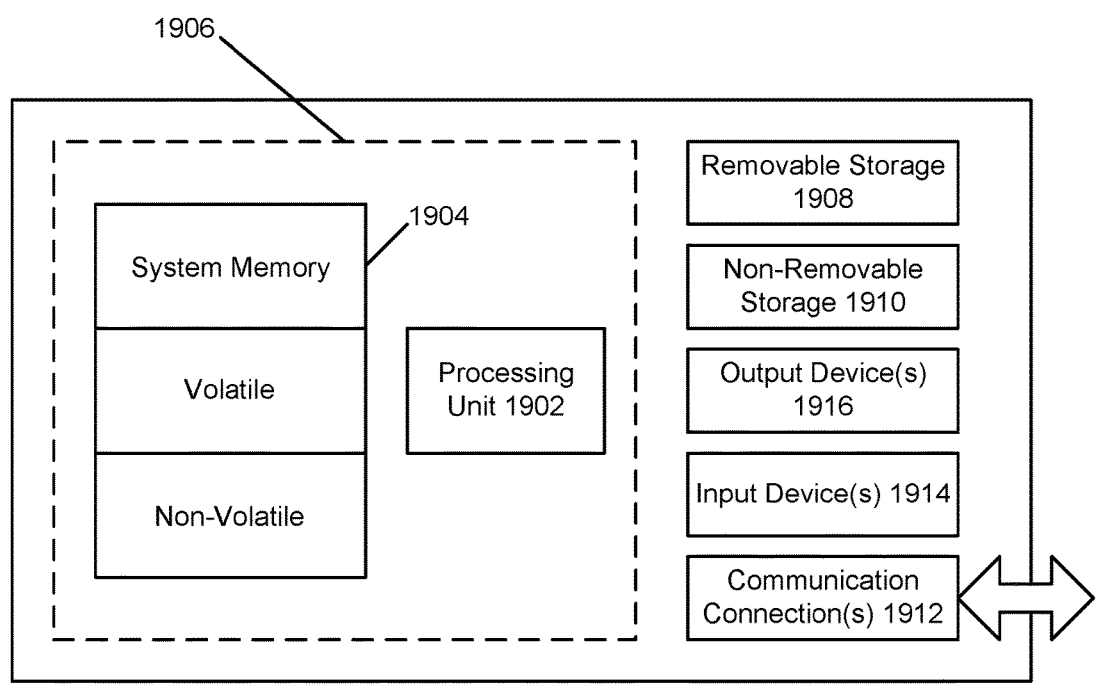
FIG. 19 shows an exemplary computing environment in which example embodiments and aspects may be implemented.

The client device 110 and the route engine 160 may be implemented using a variety of computing devices such as smartphones, desktop computers, laptop computers, tablets, and video game consoles. Other types of computing devices may be supported. A suitable computing device is illustrated in FIG. 19 as the computing device 1900.

Each client device 110 may further include a route client 113. The route client 113 may receive a line 125 from a user associated with the client device 110. The line 125 may be made up of a plurality of segments 127. Depending on the implementation, the line 125 may be "drawn" by the user using a user interface provided by the route client 113. For example, a user may use a finger, stylus, or other input mechanism, to define a line 125 on a display associated with the client device 110. In response, the route client 113 may display the line 125 on the display of the client device 110. Other methods for providing a line 125 to a computing device may be supported.

The route client 113 may further display a map to the user. The received line 125 may be placed on the map by the user. The line 125 placed on the map by the user may represent a route or path that the user would like to take between an origin address and a destination address on the map. The placement of the line 125, or a segment 127 of the line 125, on the map may refer to the positions, locations, or coordinates of the map that the line 125 or the segment 127 is located on. Depending on the implementation, the origin and destination addresses associated with the line 125 may be determined automatically by the route client 113 based on the beginning and the end of the line 125. Alternatively or additionally, the user may manually specify one or both of the origin and destination addresses in a drop down box or other user interface element.

The route client 113 may generate a route 165 that corresponds to the line 125. The route 165 may include a plurality of road sections 167. Each road section 167 may correspond to a highway, local road, or any other type of road or road category typically found on a map.

For example, a user may desire to travel from their house to a coffee shop, but because it is a nice day, the user would like to take a route 165 that passes through a particular park. Accordingly, the user may draw a line 125 on the display of their client device 110 that has an origin address of their house and a destination address of the coffee shop, and that passes through the park. The route client 113 may generate a route 165 that has an origin address of their house and a destination address of the coffee shop, and that also passes through the park.

The generated route 165 may be an approximation of the line 125 drawn by the user, and may be generated by the route client 113 by replacing the segments 127 of the line 125 with road sections 167 from the map. Because the line 125 is drawn by the user, there may not be any road sections 167 that correspond to each segment 127, and therefore the route client 113 may select the road section 167 that best corresponds to each segment 127. For example, the route client 113 may, for each segment 127, select the road section 167 that is the most similar to, or closest to, the segment 127. The selection may be based on the placement of the segment 127 on the map.

As may be appreciated, merely selecting road sections 167 based on placement on the map may fail to capture the intent of the user when they generated the line 125. Continuing the example above, when the user created the line 125 for the trip from their house to the coffee shop, they may have intended that the generated route 165 use only road sections 167 that are local roads. However, because of the placement of the segments 127 on the map, some of the generated route 165 may include road sections 167 that are highways.

Accordingly, to generate routes 165 that better reflect the intent of the user, the environment 100 may further include the route engine 160. In some implementations, the route engine 160, in addition to the placement of the line 125 on the map, may also consider a zoom level 135 at which the user is viewing the map. The zoom level 135 that a user is viewing a map may control the amount of detail of the map that is shown to the user, as well as the scale at which the user is viewing the map. For example, at a lowest zoom level 135 of a map, the user may see individual continents, but no roads. At an intermediate zoom level 135, the user may see individual countries including highways and some major roads, but many local roads may not be visible. At a highest or maximum zoom level 135, the user may see all the roads including highways and local roads of a city, as well as individual neighborhoods and houses. Other levels of zoom may be supported.

The route engine 160 may consider zoom levels 135 by, when selecting a road sections 167 to replace a segment 127 of a line 125, favoring certain types or classes of road sections 167 based on the zoom level 135. For example, when there is a low zoom level 135 (indicating that the user is zoomed out), the route engine 160 may favor road sections 167 that are highways or freeways over road sections 167 that are local roads. Similarly, when there is high zoom level 135 (indicating that the user is zoomed in), the route engine 160 may favor road sections 167 that are local roads over road sections 167 that are highways.

Figure 2:
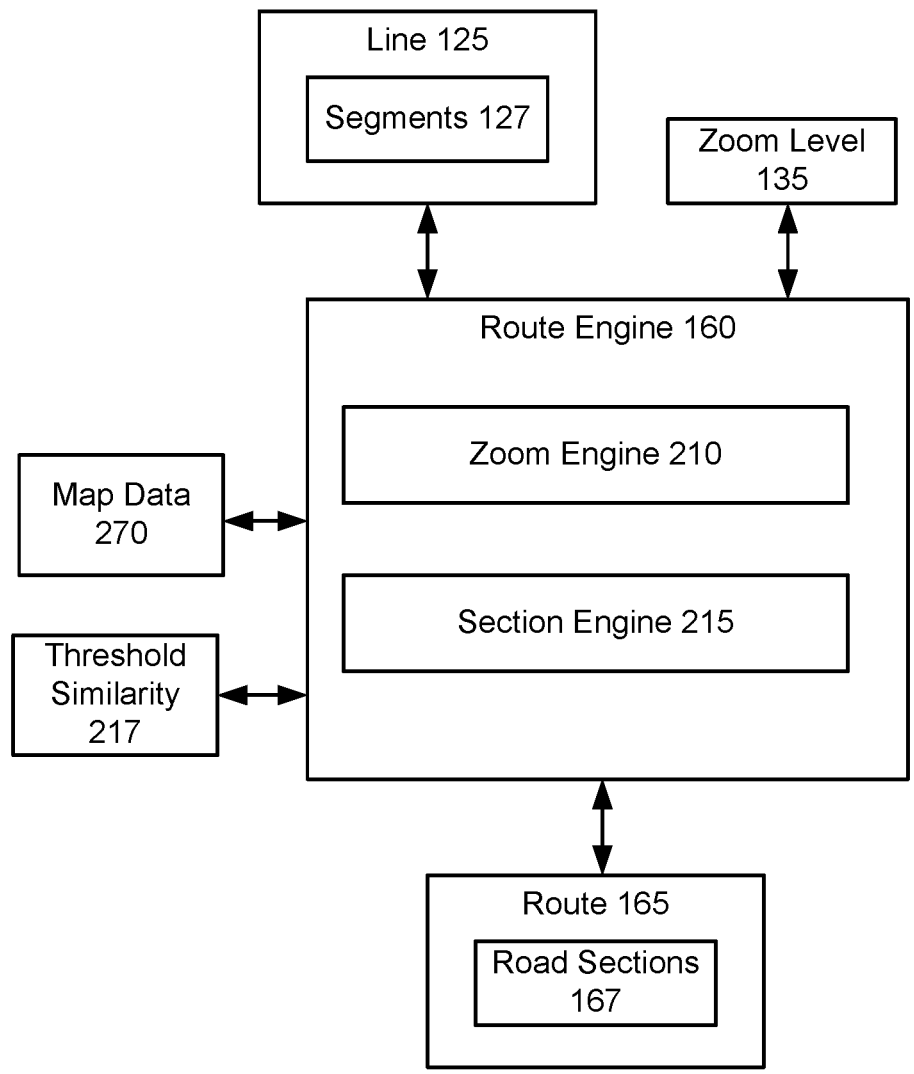
FIG. 2 is an illustration of an implementation of an exemplary route engine.

FIG. 2 is an illustration of an implementation of an exemplary route engine 160. The route engine 160 may include one or more components including a zoom engine 210 and a section engine 215. More or fewer components may be included in the route engine 160. Some or all of the components of the route engine 160 may be implemented by one or more computing devices such as the computing device 1900 described with respect to FIG. 19. In addition, some or all of the functionality attributed to the route engine 160 may also be performed by the route client 113, and vice versa.

The zoom engine 210 may assign zoom levels 135 to road sections 167. The road sections 167 may be part of a map and may be stored by the zoom engine 210 as map data 270.

Depending on the implementation, the zoom engine 210 may assign zoom levels 135 to road sections 167 based on a classification or a type associated with each road section 167. The types may include interstates, freeways, collectors, and local roads. Other types of roads or road classifications may be supported.

Interstates and freeways may be the highest road type, and may include roads that were designed for long distance travel. Typically, these roads include directional travel lanes that are separated by physical barriers and only permit access at a limited number of on and off-ramps.

Collectors are roads that connect local roads with interstates and freeways. These roads may have higher typical speed limits than local roads. Unlike freeways and interstates, these roads may be accessed by grade level intersections and may include traffic lights and other signaling.

Local roads are the lowest road type. Typically, these roads are not used for long distance travel, and serve residential neighborhoods. These types of roads generally make up the largest percentage of roads and road sections 167 on the map.

Depending on the implementation, the road sections 167 of the map may be pre-classified into one or more types. For example, a map service or other provider may provide the types for the road sections 167 in the map data 270. Alternatively, a user or an administrator may manually assign a type to each road section 167, or the types may be assigned automatically by a computer using guidelines or other criteria.

The zoom engine 210 may assign a zoom level 135 to each road section 167 based on the type associated with each road section 167. Depending on the implementation, the zoom level 135 assigned to each roach section 167 may be a number that corresponds to a zoom level 135. For example, in a system that uses eight levels of zoom, an example zoom level 135 that may be assigned to local roads may be "3", and an example zoom level 135 that may be assigned to interstates may be "5". More or fewer zoom levels 135 may be supported.

Alternatively, the zoom level 135 assigned to each road section 167 may be a range of zoom levels 135. For example, in a system that uses thirty levels of zoom, an example zoom level 135 range that may be assigned to local roads may be "1-10", an example zoom level 135 range that may be assigned to collectors may be "11-20", and an example zoom level 135 range that may be assigned to interstates may be "21-30". Rather than ranges, words such as "low", "medium", and "high" may be associated with each road section 167. The particular zoom levels 135 that are associated with each road section 167 type may be set by a user or an administrator.

The section engine 215 may receive a line 125 from a user via a route client 113, and may generate a route 165 that is based on the received line 125. The route 165 may approximate the line 125 generated using road sections 167 from the map. The received line 125 may have been drawn by the user of the route client 113, and may have an associated placement on the map. For example, the placement may indicate where on the map each of the segments 127 of the line 125 are located, or may indicate which parts of the map are covered by each segment 127.

The line 125 may further be associated with an origin address and a destination address. The origin address may be the start of the line 125, and the destination address may be the end of the line 125.

The section engine 215 may further receive a zoom level 135 associated with the received line 125. The zoom level 135 may be the zoom level 135 that was active or selected by the user for the map when the user generated the line 125. For example, the user may control the zoom level 135 using gestures, or by selecting a slider or other user interface element that may be provided by the route client 113.

The section engine 215 may, for each segment 127, select a road section 167 from the map data 270 that approximates the segment 127. For example, the section engine 215 may select a road section 267 that is most similar to the segment 127. Many techniques for determining the similarity of a segment 127 and a road section 267 may be used.

In some implementations, the section engine 215 may determine the similarity of a segment 127 and a road section 167 based on the placement of the segment 127 on the map. For example, the similarity may be based on what percentage of the road section 167 is "covered" by the placement of the road section 167 on the map. In another example, the similarity may be based on how close the placement of the beginning of the segment 127 and/or the placement of the ending of segment 127 is to the beginning and/or ending of the road section 167. Other factors that may be used to determine the similarity of a segment 127 and a road section 167 may include the overall lengths of the segment 127 and the road section 167, and the directions of the segment 127 and the road section 167.

The section engine 215 may further consider the zoom level 135 associated with each road section 167 when selecting a similar road section 167. In some implementations, the section engine 215 may consider the zoom level 135 by initially only considering road sections 167 that have the same associated zoom level 135 as the received line 125 when selecting a similar road section 167. For example, if the zoom level 135 associated with the received line 125 is "3", then the section engine 215 may only consider road sections 167 that are also associated with the zoom level 135 of "3".

As may be appreciated, it may not always be possible for the section engine 215 to only select road sections 167 that have the same zoom level 135 as the line 125 or the map. In particular, either the destination address or the origin address of the line 125 may not be accessible by a road section 167 with the same zoom level 135 as the line 125. For example, the zoom level 135 of the line 125 may be "low" indicating that the section engine 215 may select road sections 167 that are highways or freeways. However, the destination address may be only accessible by a local road, making the selection of a road section 167 that is a highway or freeway for the final segment of the line 125 impossible.

In another example, the zoom level of the line 125 may be "high" indicating that the section engine 215 may select road sections 167 that are local roads. However, based on the placement of one or more segments 127 on the map the only road sections 167 that are local roads that can be selected to replace the segments 127 may be too dissimilar from the segments 127. In such situations, it may be preferable to select a segment 127 that has a different associated zoom level 135 than the line 125, instead of selecting a segment 127 that is too dissimilar than the segment 127 that it is selected to replace.

Accordingly, to allow flexibility when selecting road sections 167, the section engine 215 may further consider a threshold similarity 217 when selecting a road section 167. In particular, after the section engine 215 selects a road section 167 with the same zoom level 135 as the line 125 to replace a segment 127, the section engine 215 may determine if the similarity of the selected road section 167 and the segment 127 that it is to replace is above the threshold similarity 217. Depending on the implementation, the determined similarity may be a percentage (i.e., 80% percent similar, 70% similar, etc.), and the threshold similarity 217 may be the minimum similarity that is acceptable (i.e., greater than 80%, greater than 60%, greater than 50%, greater than 40% etc.). The threshold similarity 217 may be set by a user or an administrator.

If the similarity is not above the threshold similarity 217, then the section engine 215 may select a new road section 167. However, the section engine 215 may relax the requirement that the selected road section 167 have the same zoom level 135 as the line 125. For example, the section engine 215 may consider road sections 167 having a zoom level 135 that is one step above or below the zoom level 135 of the line 125.

The section engine 215 may continue to select road sections 167 until a road section 167 has been selected for each segment 127 of the line 125. The selected road sections 167 may be output by the route engine 160 as the route 165. The route client 113 may present the route 165 to the user associated with the client device 110. The route client 113 may present the route 165 by displaying the route 165 on the display associated with the client device 110. The route 165 may be displayed along with the original line 125, or may be displayed in place of the original line 125. The user may accept or reject the displayed route 165. Depending on the implementation, the route 165 may be presented along with "turn-by-turn" instructions to follow the route 165. Other information may be presented.

In some implementations, the section engine 215 may provide the route 165 to the route client 113 after the entire line 125 has been completed. For example, the section engine 215 may wait until the user has finished drawing the line before replacing the line 125 with the route 165. Alternatively, the section engine 215 may begin to select the road sections 167 for the route 165 while the user is drawing the line 125.

For example, while the user draws the line 125, segments 127 of the line 125 may be provided to the route engine 160, and the section engine 215 may select one or more road sections 167 to replace each segment 127. The segments 127 of the line 125 may be replaced by the selected road sections 167 as the user continues to draw the line 125, making the segments 127 of the line 125 appear to "snap" to the map as the drawn segments 127 are replaced with the selected road sections 167.

Figure 3:
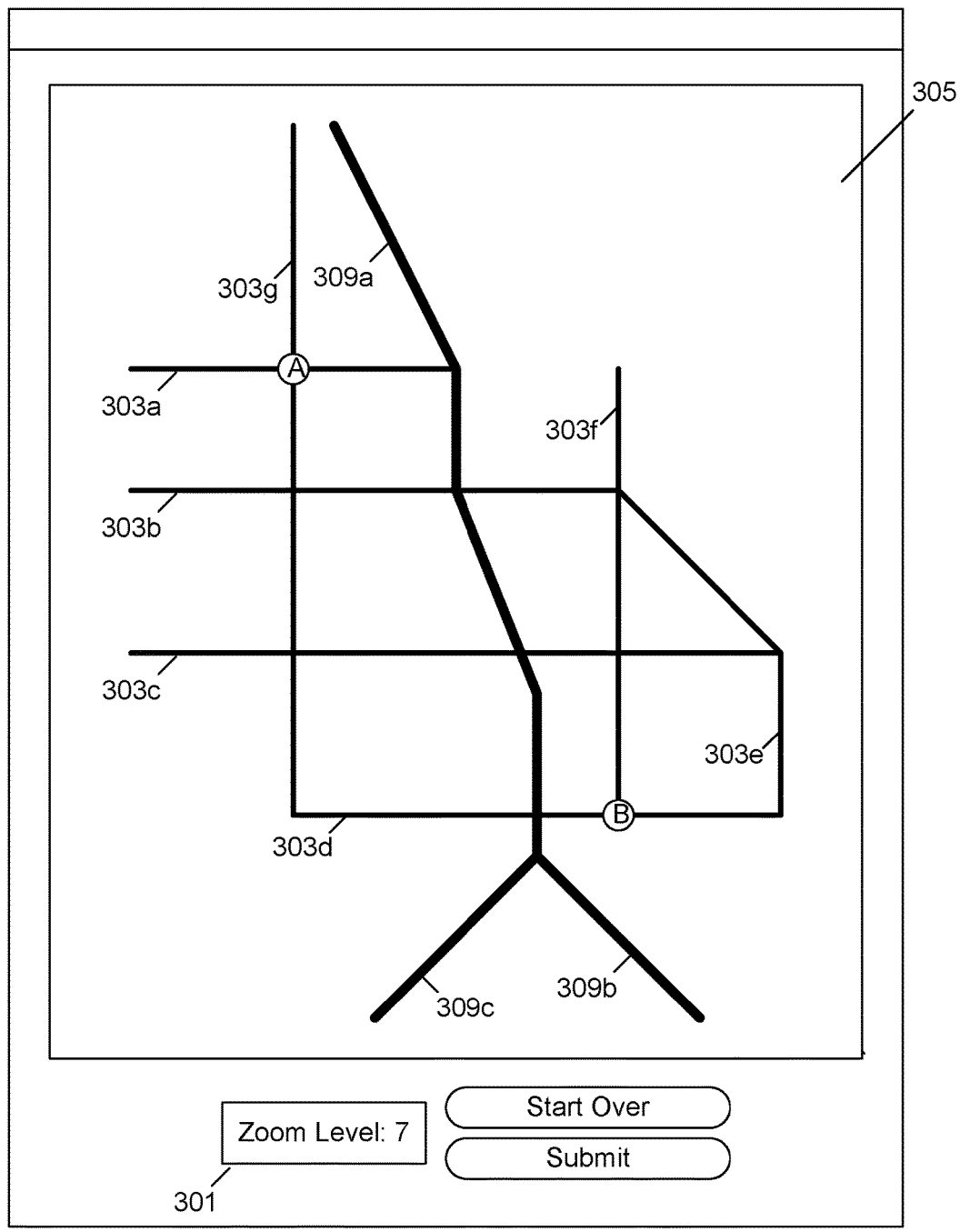
FIGS. 3-15 are illustrations of example user interfaces for presenting routes based on lines.

FIG. 3 is an illustration of an example user interface 300 for presenting routes 165 based on lines 125. As shown, the user interface 300 displays a map 305 of a section of a city. The user interface 300 also includes a user interface element 301 through which a user can select the zoom level 135. In the example shown, the user has selected a zoom level 135 of "7".

The map 305 includes one or more or more local roads 303. In the example shown, the local roads 303 that are visible in the map at the selected zoom level 135 include the local roads 303a, 303b, 303c, 303d, 303e, 303f, and 303g. The map 305 also includes one or more highways 309. In the example shown the highways 309 that are visible include the highways 309a, 309b, and 309c.

As described above, the user can use the user interface 300 to receive a route 165 between an origin address and a destination address. The origin address is illustrated on the map 305 as the location A, and the destination address is illustrated on the map 305 as the location B.

Figure 4:
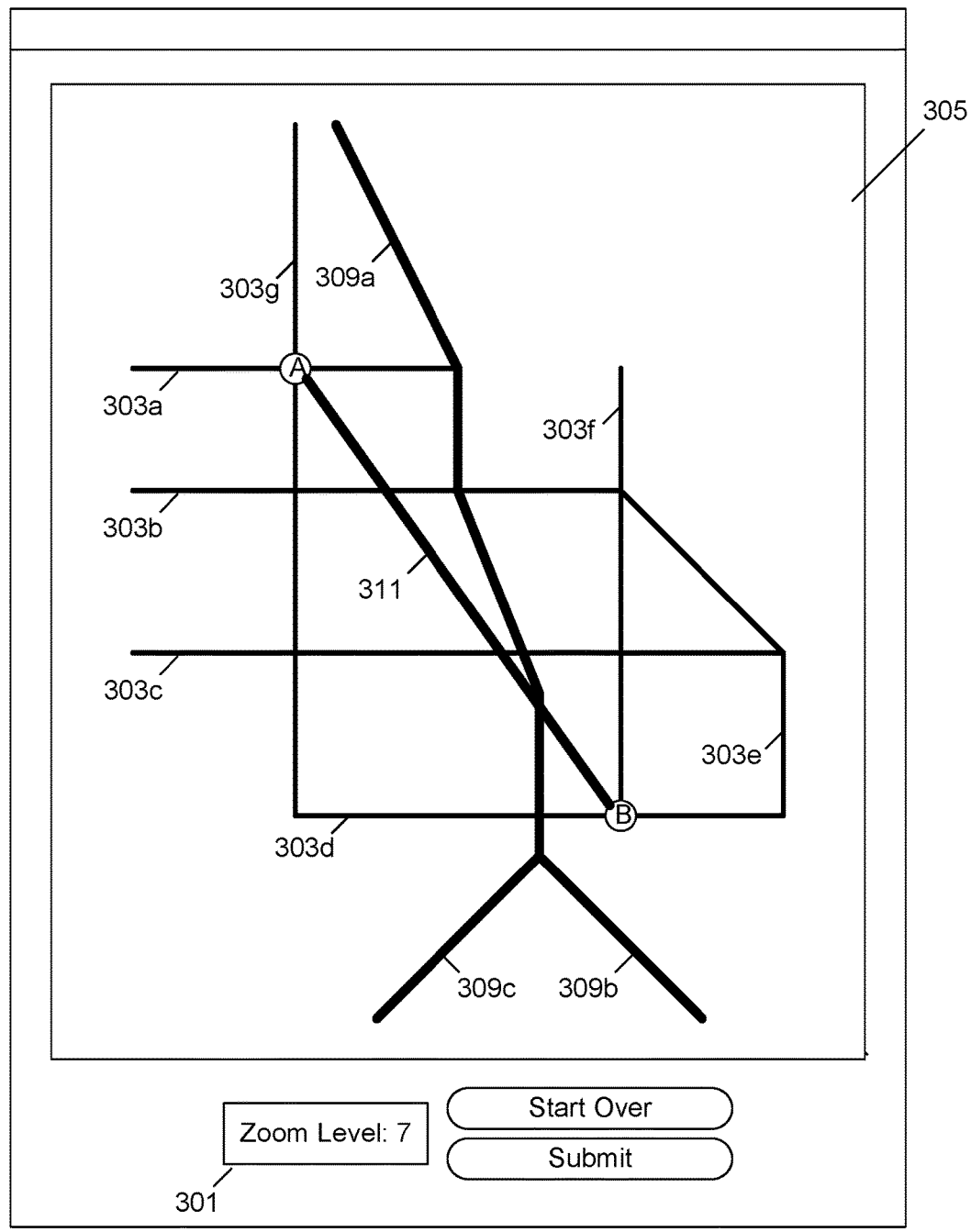

Continuing to FIG. 4, the user has drawn a line 311 on the map 305 that connects the location A with the location B. The line 311 indicates that the user would like to receive a route 165 between the location A to the location B. In response to the user drawing the line 311, the route client 113 may provide the line 311 to the route engine 160 along with the selected zoom level 135 of "7".

Figure 5:
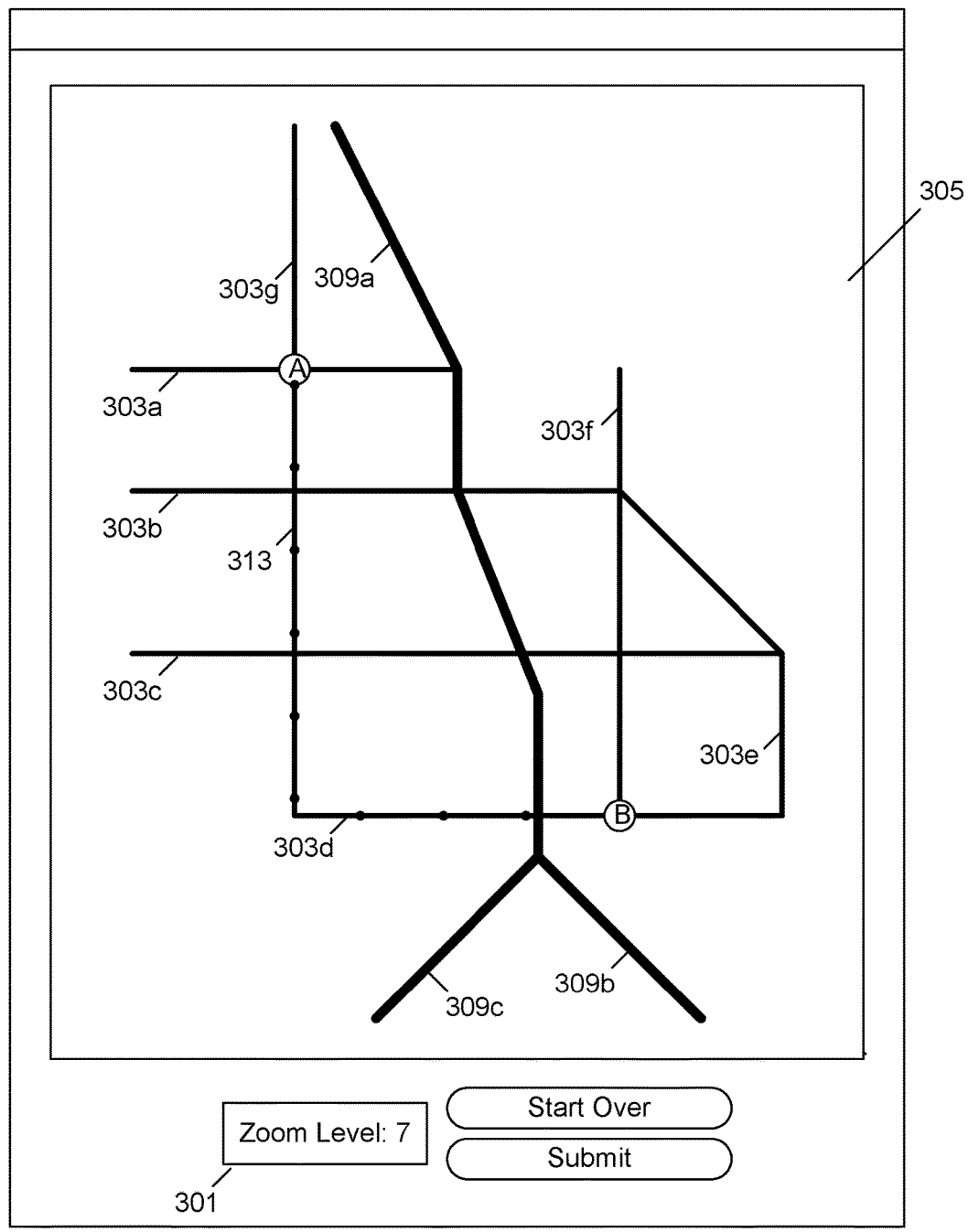

Continuing to FIG. 5, the route engine 160 has generated a route 313 based on the line 311. The route 313 is displayed on the map 305 using a dotted line that connects the location A with the location B. Because the selected zoom level 135 was "7", the route engine 160 generated the route 313 using road sections 167 that have the same zoom level 135. In the example shown, the local roads 303 are associated with the zoom level 135 of "7". Accordingly, the route 313 only includes road sections 167 from the local roads 303. As shown, the route 313 includes road sections from the local roads 303g and 303d.

If the user approves of the displayed route 313, the user may select the user interface element labeled "Submit". In response, the user may be presented with directions corresponding to the route 313.

If the user does not approve of the displayed route 313, the user may select the user interface element labeled "Start Over." In response, the route 313 may be removed from the map 305, and the user may draw a new line 125 on the map 305.

Figure 6:
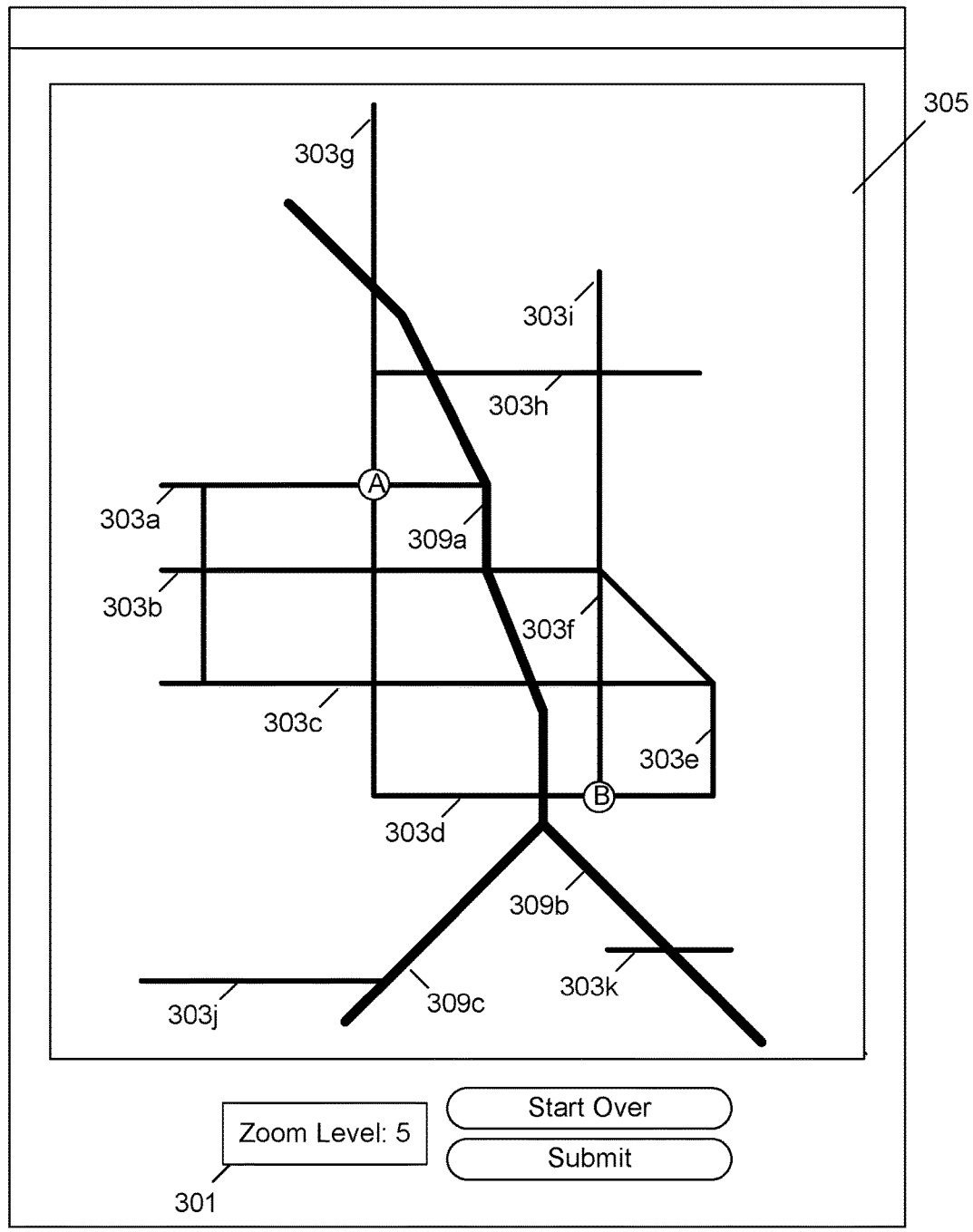

Continuing to FIG. 6, the user has opted to "Start Over" and has adjusted the zoom level 135 to "5" using the user interface 301. As a result, the route 313 has been removed and the map 305 has been "zoomed out". Because of the new zoom level 135, additional local roads 303 can be seen in the map 505. For example, the map 305 now shows the local roads 303h, 303i, 303j, and 303k.

Figure 7:
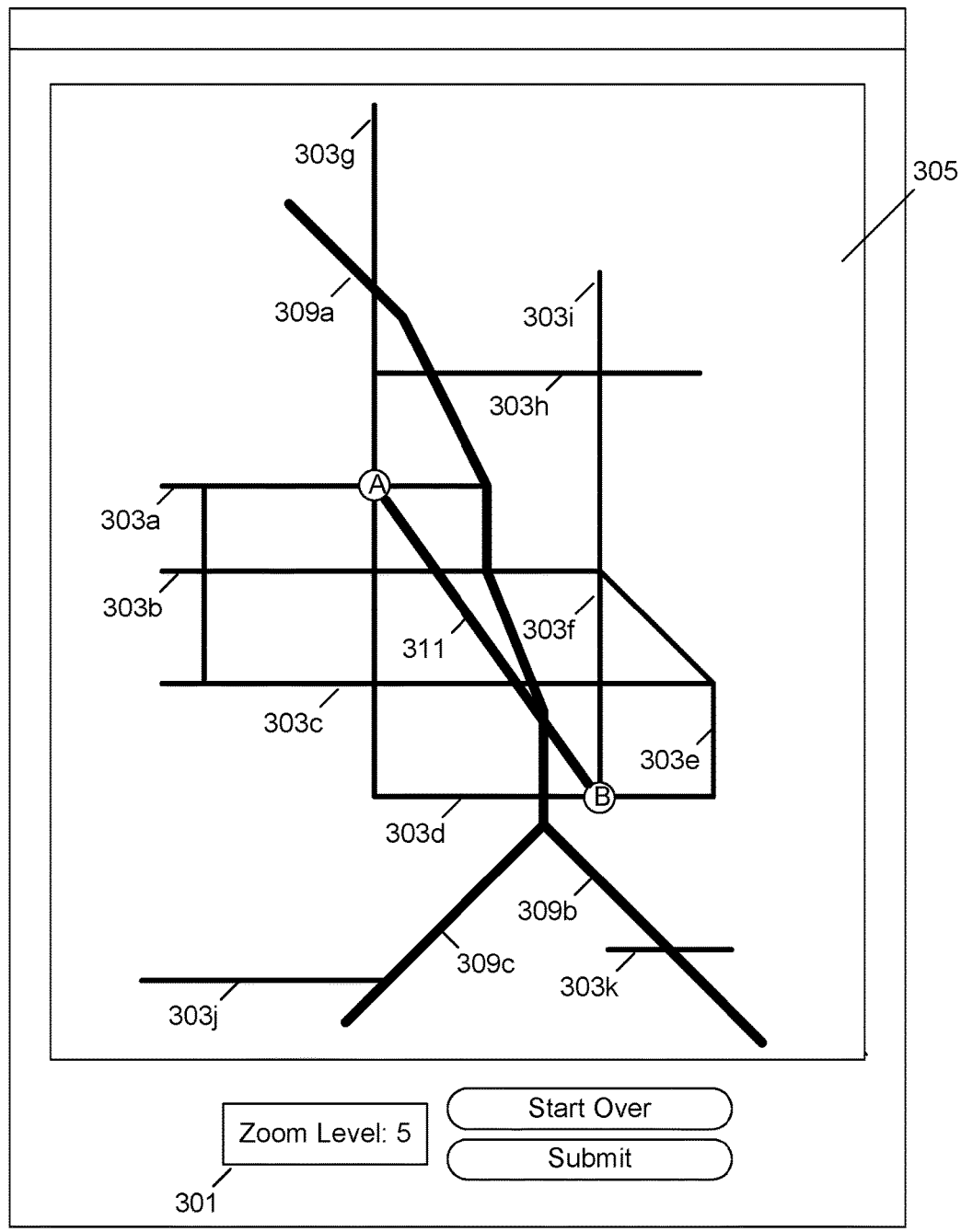

Continuing to FIG. 7, the user has again drawn the line 311 on the map 305 that connects the location A with the location B. In response to the user drawing the line 311, the route client 113 may provide the line 311 to the route engine 160 along with the selected new zoom level 135 of "5".

Figure 8:
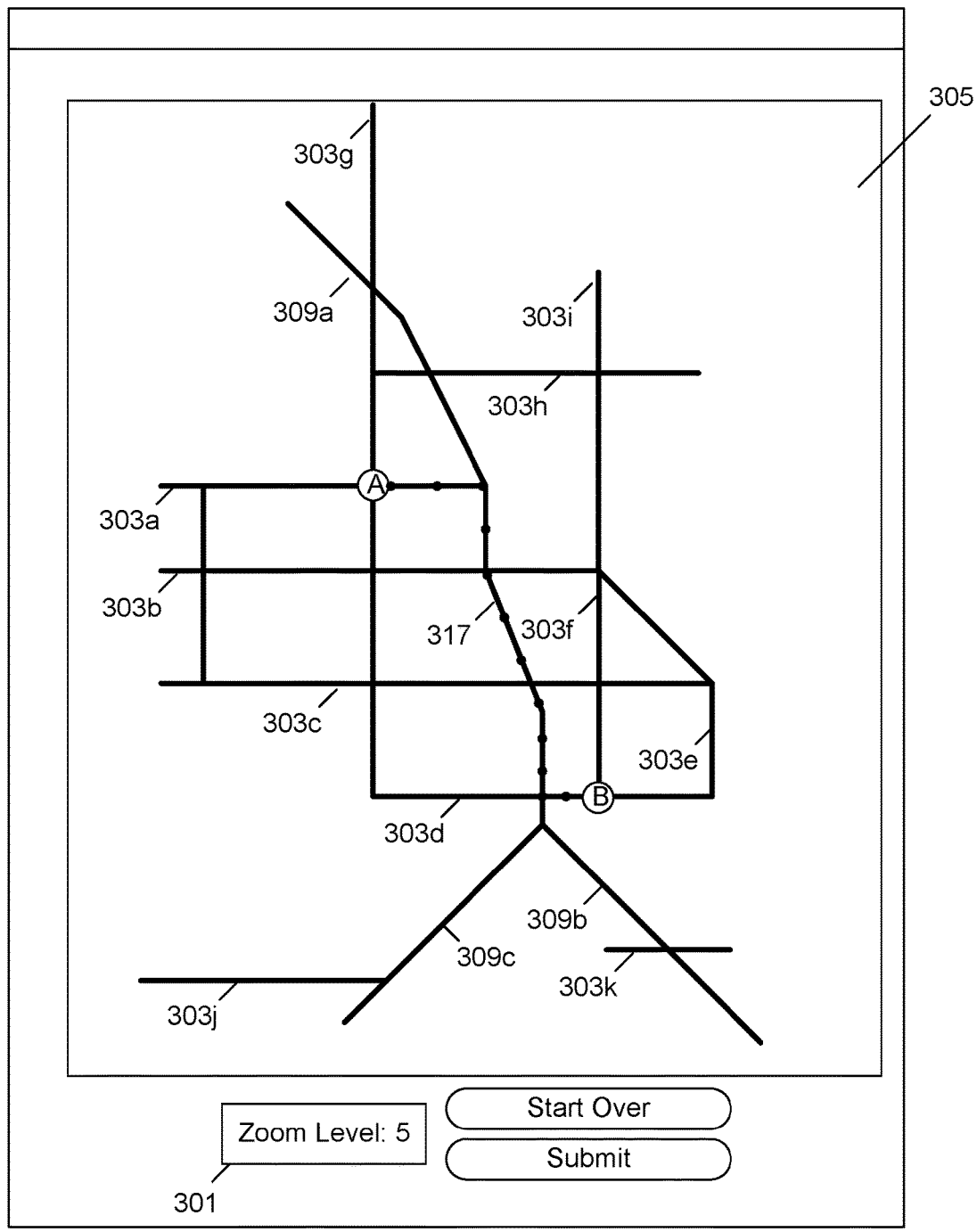

Continuing to FIG. 8, the route engine 160 has generated a route 317 based on the line 311. The route 317 is displayed on the map 305 using a dotted line connecting the location A with the location B. Because the selected zoom level 135 was "5", the route engine 160 generated the route 317 using road sections 167 that have a zoom level 135 of "5". In the example shown, the highways 309 are associated with the zoom level 135 of "5". Accordingly, the route 317 primarily includes road sections 167 from the highway 309a.

As shown, the route 317 also includes road sections 167 from the local roads 303g and 303d. Because the locations A and B are only accessible using local roads, the route engine 160 used the local roads 303a and 303d to complete the first and last sections 167 of the route 317.

Figure 9:
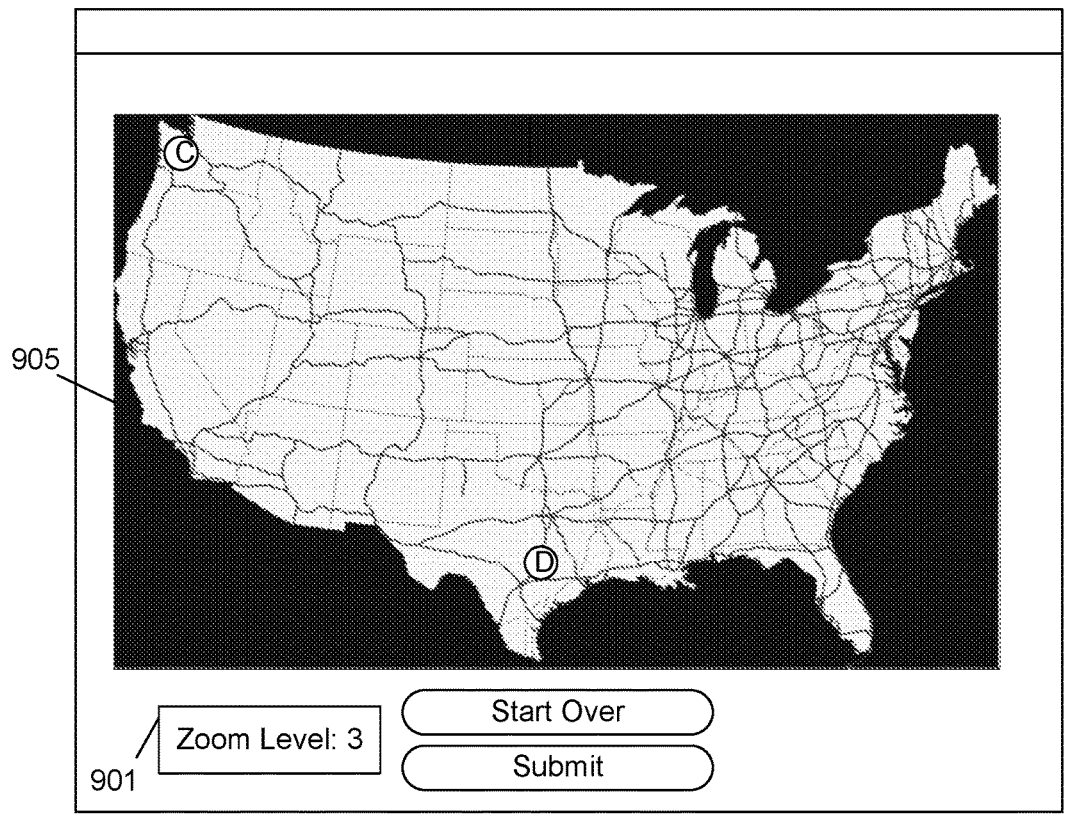

FIG. 9 is an illustration of an example user interface 900 for presenting routes 165 based on lines 125. As shown, the user interface 900 displays a map 905 of the United States. The user interface 900 also includes a user interface element 901 through which the use can select the zoom level 135. In the example shown, the user has selected a zoom level 135 of "3". Because of the low zoom level 135 selected by the user, only road sections 167 corresponding to highways or freeways are visible on the map 905.

Similar to the user interface 300, the user interface 900 allows the user to request a route 165 between an origin address and a destination address by drawing a line 125 between the locations on the map 905. The origin address is illustrated on the map 905 as the location C, and the destination address is illustrated on the map 905 as the location D.

Figure 10:
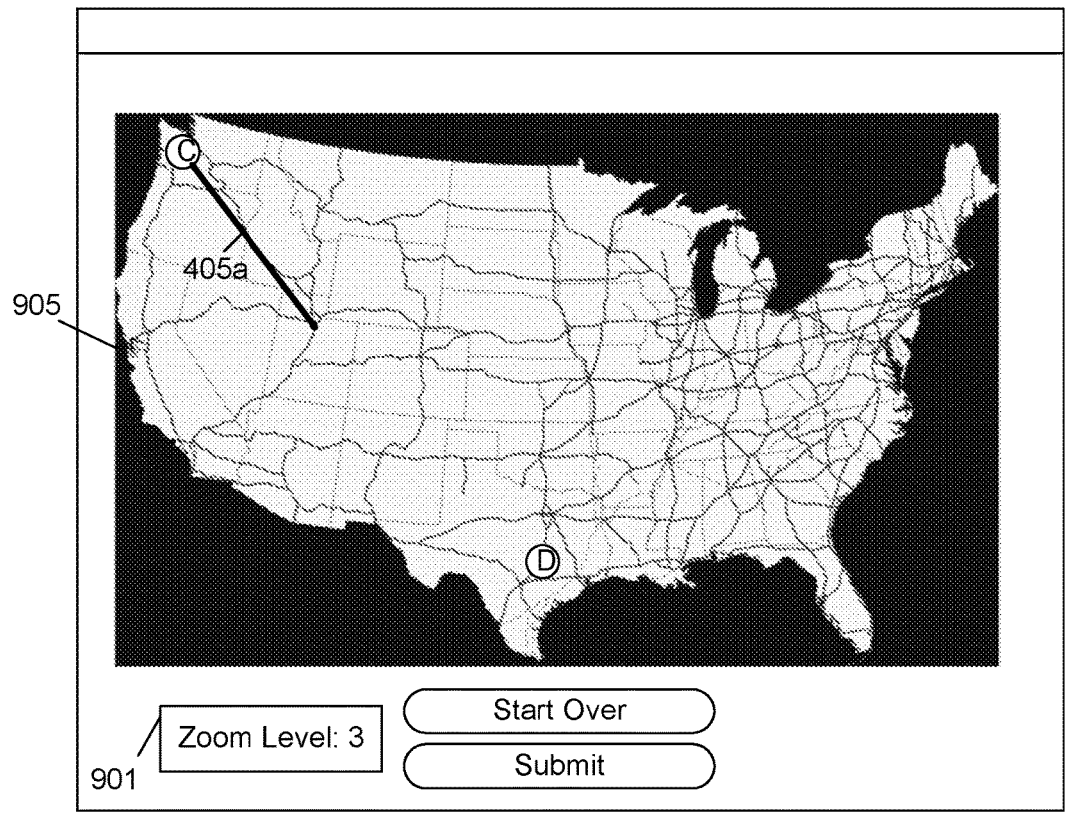

Continuing to FIG. 10, the user has begun to draw the line 125 on the map 905. As shown, the user has begun to draw the line 125 by drawing a segment 405a that starts at the location C. In the implementation shown in the user interface 900, rather than wait for the user to complete the line 125 before determining the route 165, the route engine 160 may begin determining road sections 167 that are similar to the segment 405a of the line 125 as soon as the user begins drawing the line 125.

Figure 11:
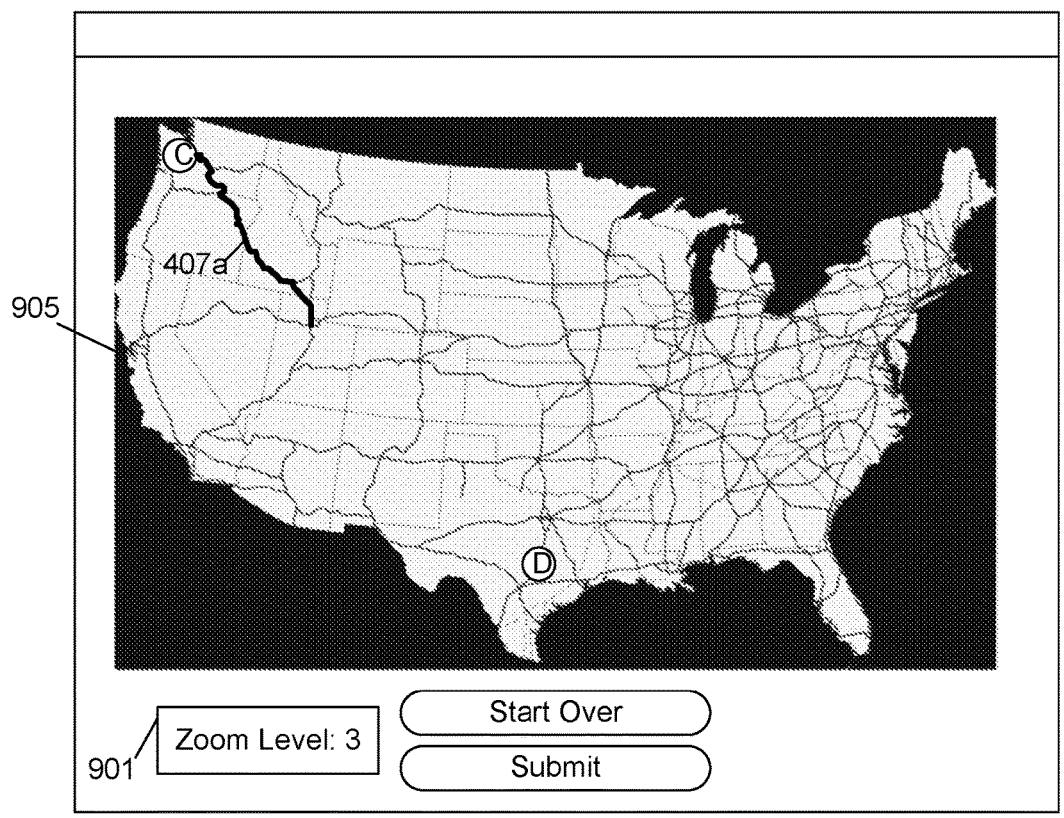

Continuing to FIG. 11, the route engine 160 has replaced the segment 405a with the road section 407a on the map 905. Because the road section 407a replaced the segment 405a as the user was drawing the line 125, the segment 405a appears to "snap" onto the map 905 as it is replaced by the road section 407a.

Figure 12:
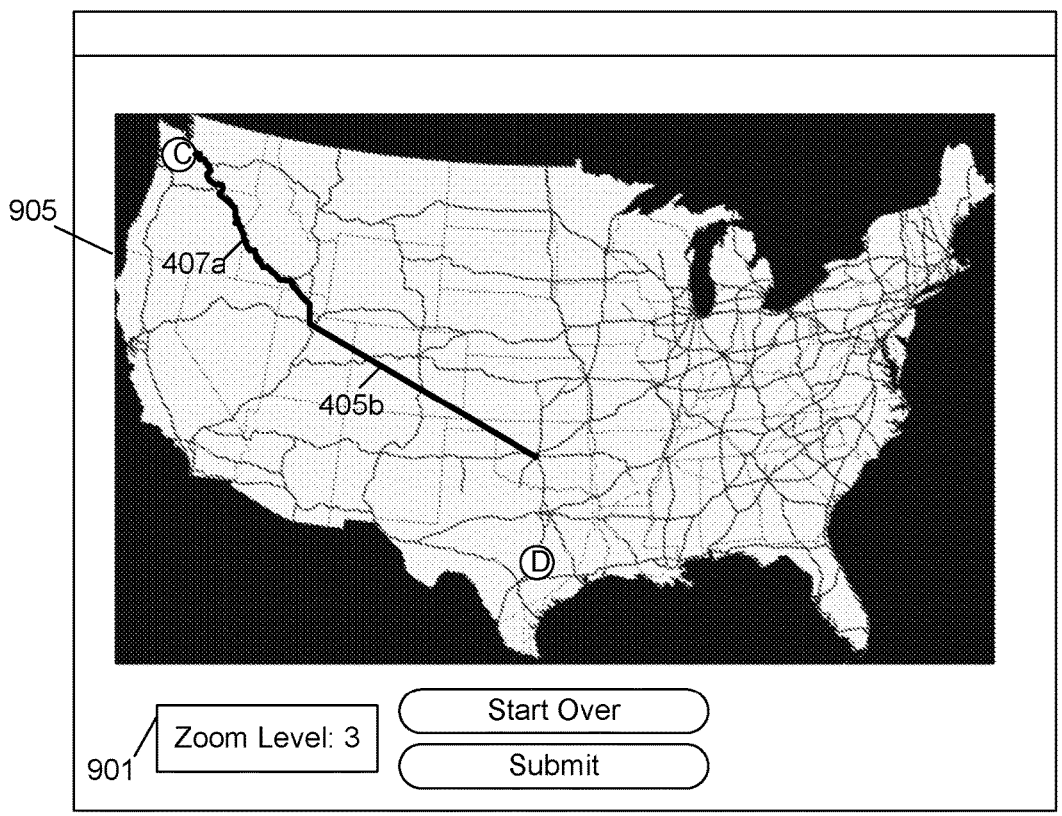

Continuing to FIG. 12, after the segment 405a was replaced, the user has continued the line 125 by drawing the segment 405b. Because the previous segment 405a was replaced by the road section 407a, the segment 405b appears to originate from the end of the road section 407a. Depending on the implementation, the road section 407a replaced the segment 405a on the map 905 before the user completed the segment 405b.

Figure 13:
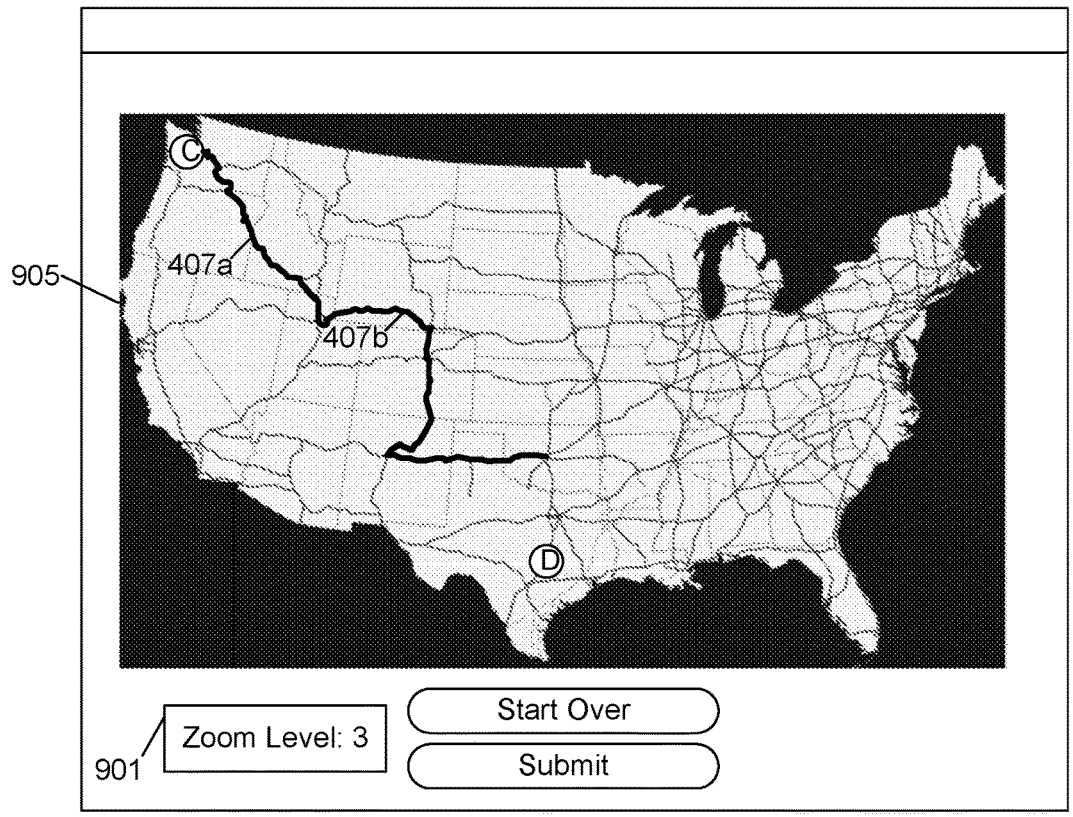

Continuing to FIG. 13, the route engine 160 has replaced the segment 405b with the road section 407b on the map 905. Similar to the segment 405a, the segment 405b appears to "snap" onto the map 905 as it is replaced by the road section 407b.

Figure 14:
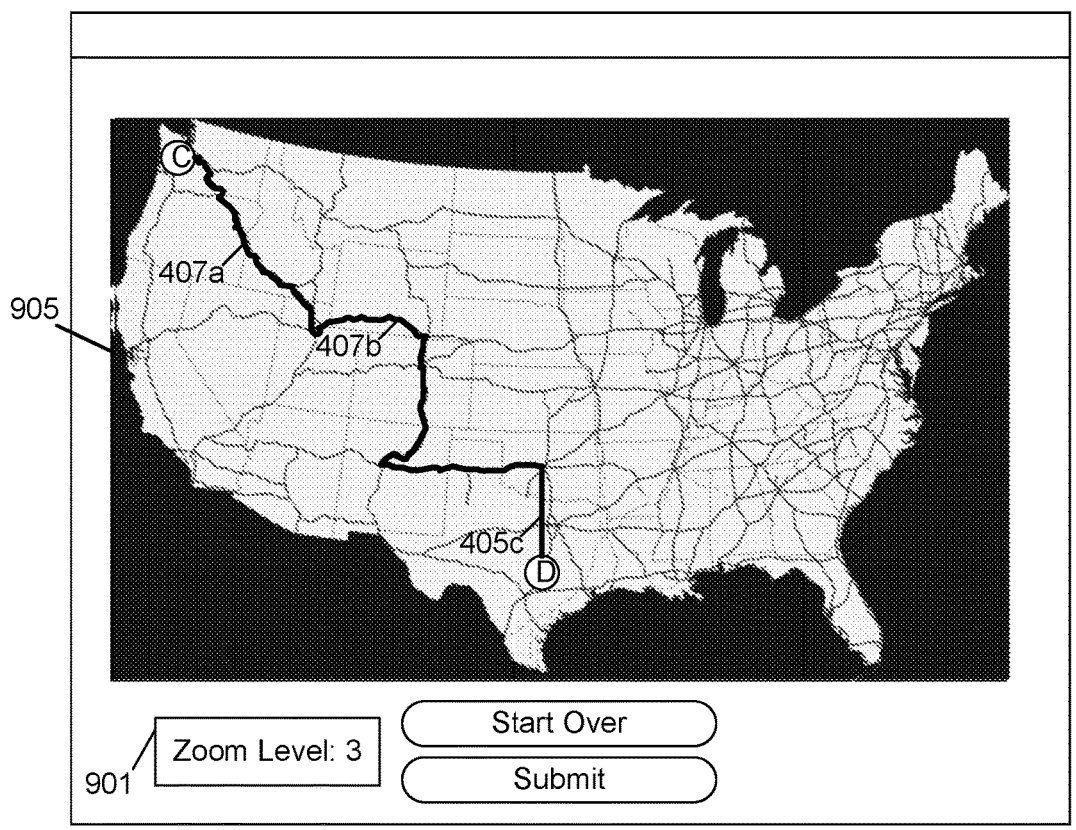

Continuing to FIG. 14, after the segment 405b was replaced, the user has continued the line 125 by drawing the segment 405c. Because the previous segment 405b was replaced by the road section 407b, the segment 405c appears to originate from the end of the road section 407b.

Figure 15:
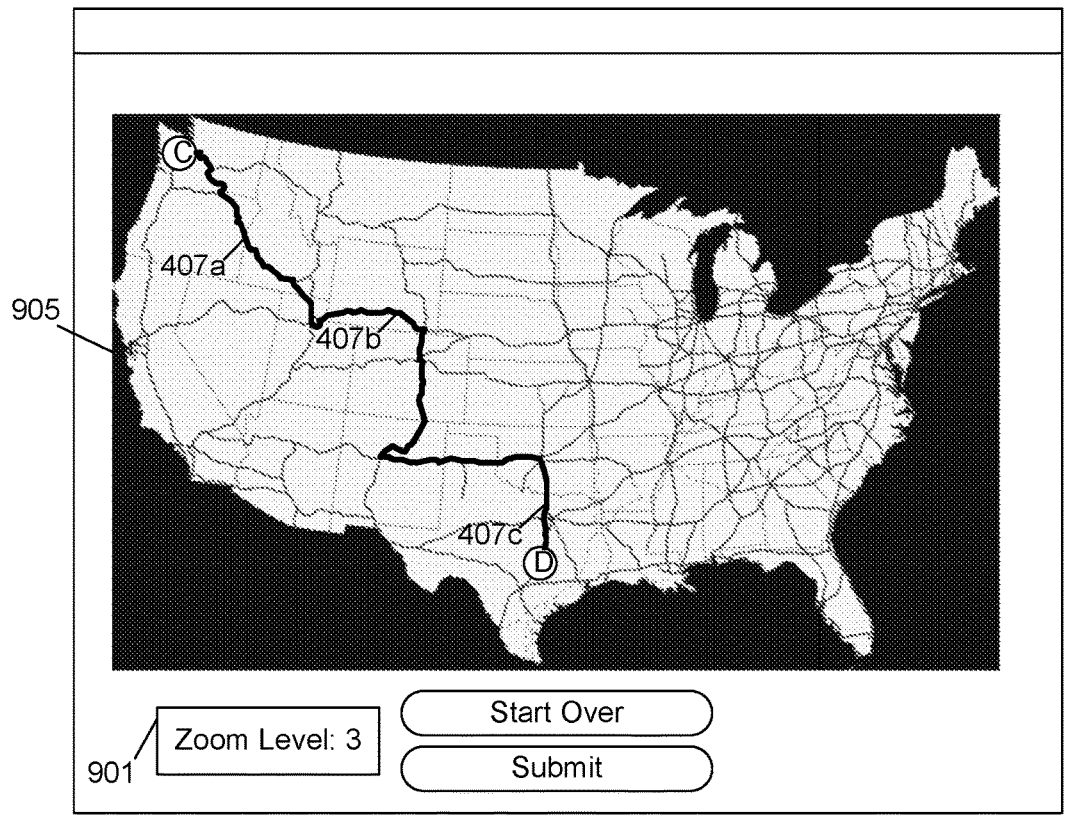

Continuing to FIG. 15, the route engine 160 has replaced the segment 405c with the road section 407c on the map 905. As shown, the line 125 has been completely replaced on the map 905 by the route 165 that includes the road sections 407a, 407b, and 407c. If the user approves of the displayed route 165, the user may select the user interface element labeled "Submit". In response, the user may be presented with directions corresponding to the route 165.

If the user does not approve of the displayed route 165, the user may select the user interface element labeled "Start Over." In response, the route 165 (including the road sections 407a, 407b, and 407c) may be removed from the map 905, and the user may draw a new line 125 on the map 905.

Figure 16:
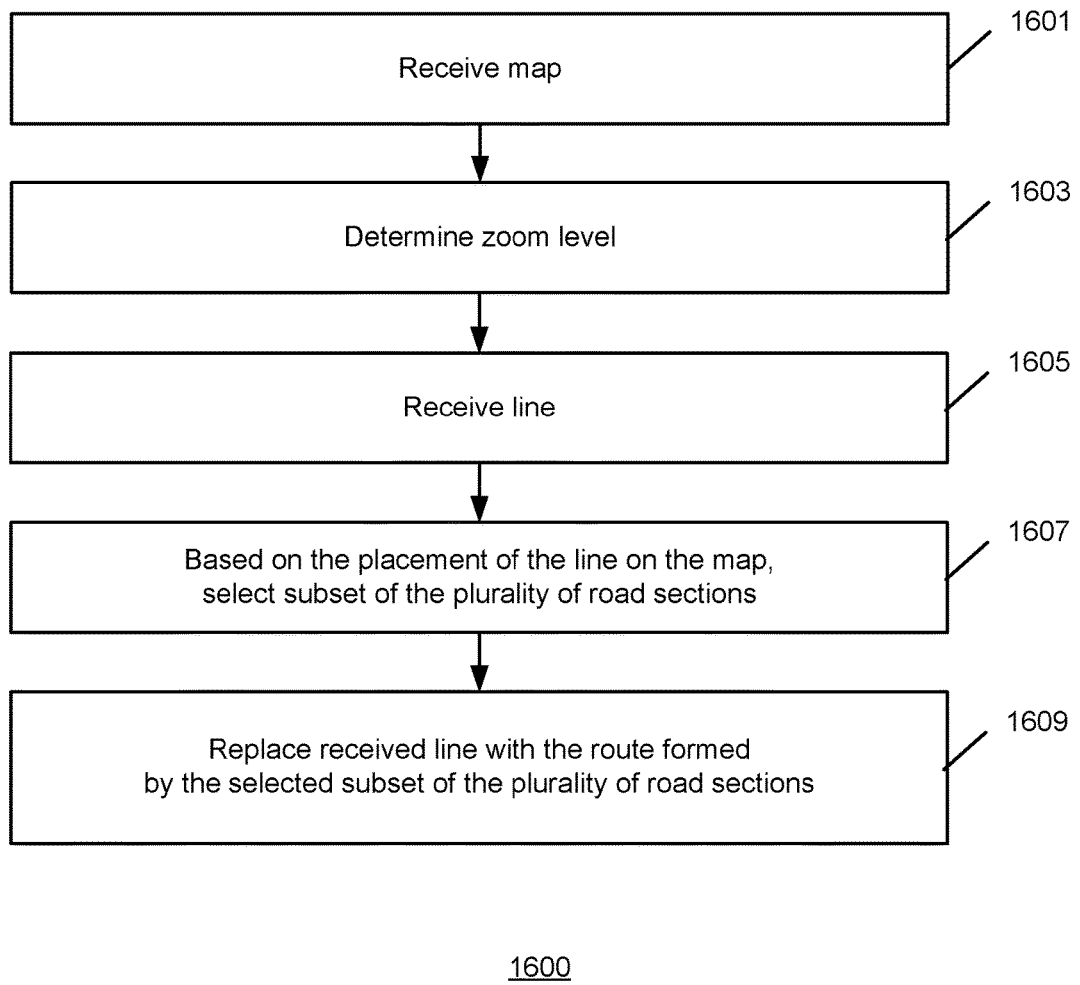
FIG. 16 is an operational flow of an implementation of a method for replacing a received line with a route on a map.

FIG. 16 is an operational flow of an implementation of a method 1600 for replacing a received line with a route on a map. The method 1600 may be implemented by the route engine 160.

At 1601, a map is received. The map may be received by the section engine 215 of the route engine 160. The map may be received from the map data 270, and may correspond to a map being viewed by a user of a route client 113. The map may include a plurality of road sections 167. The road sections 167 may correspond to types of roads such as highways, connectors, and local roads. Other types of roads may be supported. Each road section 167 may be associated with a zoom level 135 that is based, in part, on the type of the road section 167. As an example, road sections 167 that are local roads may be associated with high zoom levels 135, and road sections 167 that are highways may be associated with low zoom levels 135.

At 1603, a zoom level is determined. The zoom level 135 may be determined by the zoom engine 210 of the route engine 160. The determined zoom level 135 may be the zoom level 135 that the user is viewing the map on the route client 113. The user may be able to adjust or select the zoom level 135 using the route client 113. The zoom level 135 may be selected using a particular user interface element, or by using a particular gesture, for example.

At 1605, a line is received. The line 125 may be received by the section engine 215 of the route engine 160. The line 125 may have been drawn or otherwise defined by the user using the route client 113. For example, a user may use a stylus, or their finger, to draw the line 125 on the display of the client device 110. The location of the line 125 on the map is referred to the placement of the line 125. The placement may be represented by coordinates or other location indicators.

The line 125 may be made up of a plurality of segments 127. Depending on the implementation, each segment 127 may be the same length, or may have a different length. Similar to the line 125, each segment 127 may have a placement on the map.

The line 125 may also have an associated origin address and an associated destination address. The origin address may be the beginning of the line 125, and the destination address may be the end of the line 125. The addresses may be mailing addresses, or may be coordinates (e.g., GPS or latitude and longitude coordinates). Depending on the implementation, the origin address and the destination address may be determined by the route engine 160 based on the placement of the line 125 on the map (e.g., the route engine 160 may determine what address is located below the start of the line 125 on the map). Alternatively, the user may explicitly provide one or both of the origin address and the destination address using a user interface element displayed by the route client 113.

At 1607, based on the placement of the line on the map, a subset of the plurality of road sections is selected. The subset of the plurality of road sections 167 may be selected by the section engine 215 of the route engine 160. In some implementations, the section engine 215 may select the subset of the plurality of road sections 167 by, for each segment 127 of the line 125, selecting the road section 167 that is most similar to the segment 127 on the map having the same zoom level 135 as the determined zoom level 135, and adding the selected similar road section 167 to the subset of the plurality of road sections 167. The similarity of a road section 167 to a segment 127 may be based on a variety of factors such as the placement of the road section 167 and the segment 127 on the map, the length of the road section 167 and the segment 127, and one or both of the beginning and the ending of the road section 167 and the segment 127.

At 1609, the received line is replaced with the route formed by the selected subset of the plurality of road sections. The received line 125 may be replaced by the section engine 215 of the route engine 160. In some implementations, the route 165 may replace the line 125 by displaying the selected road sections 167 in place of their respective segments 127 on the display of the client device 110. The user may accept the displayed route 165, or may request a new route 165 be determined based on the same line 125, or a different line 125.

Figure 17:
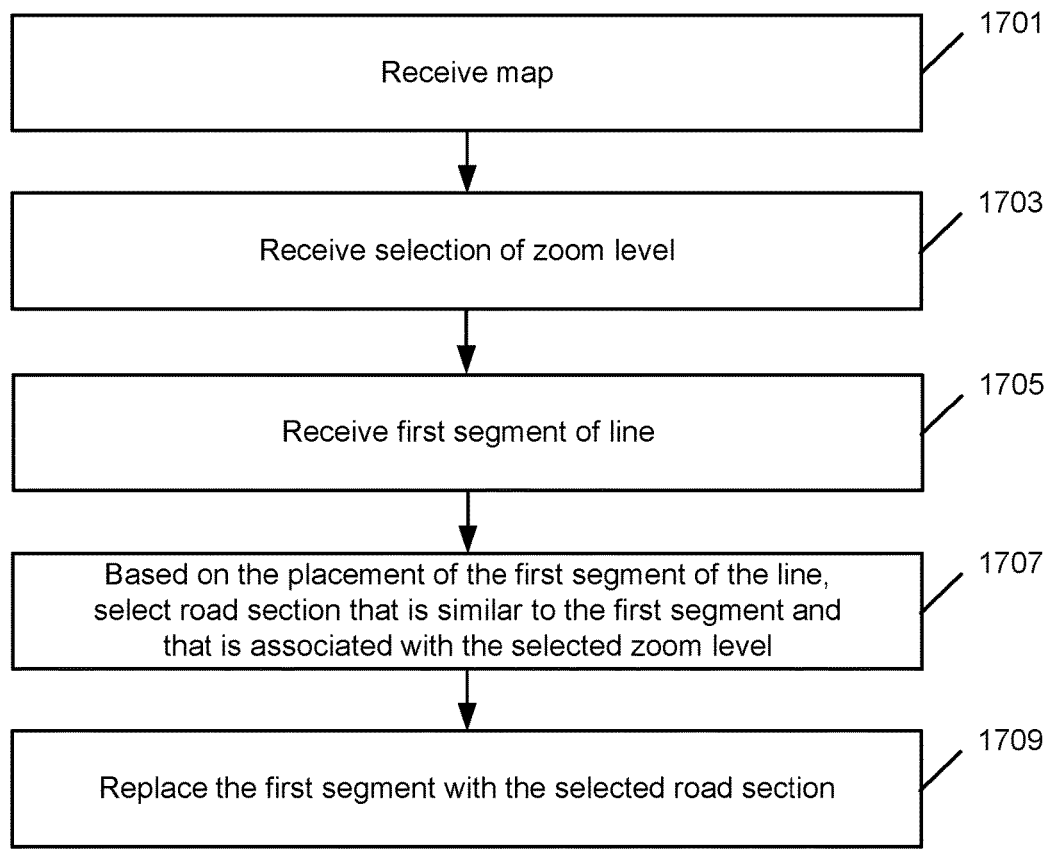
FIG. 17 is an operational flow of an implementation of a method for replacing a received line segment with a road section.

FIG. 17 is an operational flow of an implementation of a method 1700 for replacing a received line segment with a road section. The method 1700 may be implemented by the route engine 160.

At 1701, a map is received. The map may be received by the section engine 215 of the route engine 160. The map may be received from the map data 270, and may correspond to a map being viewed by a user of a route client 113. The map may include a plurality of road sections 167.

At 1703, a zoom level is selected. The zoom level 135 may be selected by a user of the route client 113.

At 1705, a first segment of a line is received. The first segment 127 of the line 125 may be received by the section engine 215 of the route engine 160. The first segment 127 may be a segment 127 of a line 125 being drawn by the user of the route client 113 on the map. Rather than wait for the user to complete the line 125, the section engine 215 may receive the first segment 127 as the user continues to draw additional segments 127 of the line 125.

At 1707, based on the placement of the first segment of the line, a road section that is similar to the first segment and that is associated with the selected zoom level is selected. The road section 167 may be selected by the section engine 215 of the route engine 160.

At 1709, the first segment is replaced with the selected road section. The first segment 127 may be replaced by the route client 113. For example, the route client 113 may display the selected road section 167 in place of the line segment 127. Depending on the implementation, the first segment 127 may be replaced before the user completes drawing a second segment 127 of the line 125.

Figure 18:
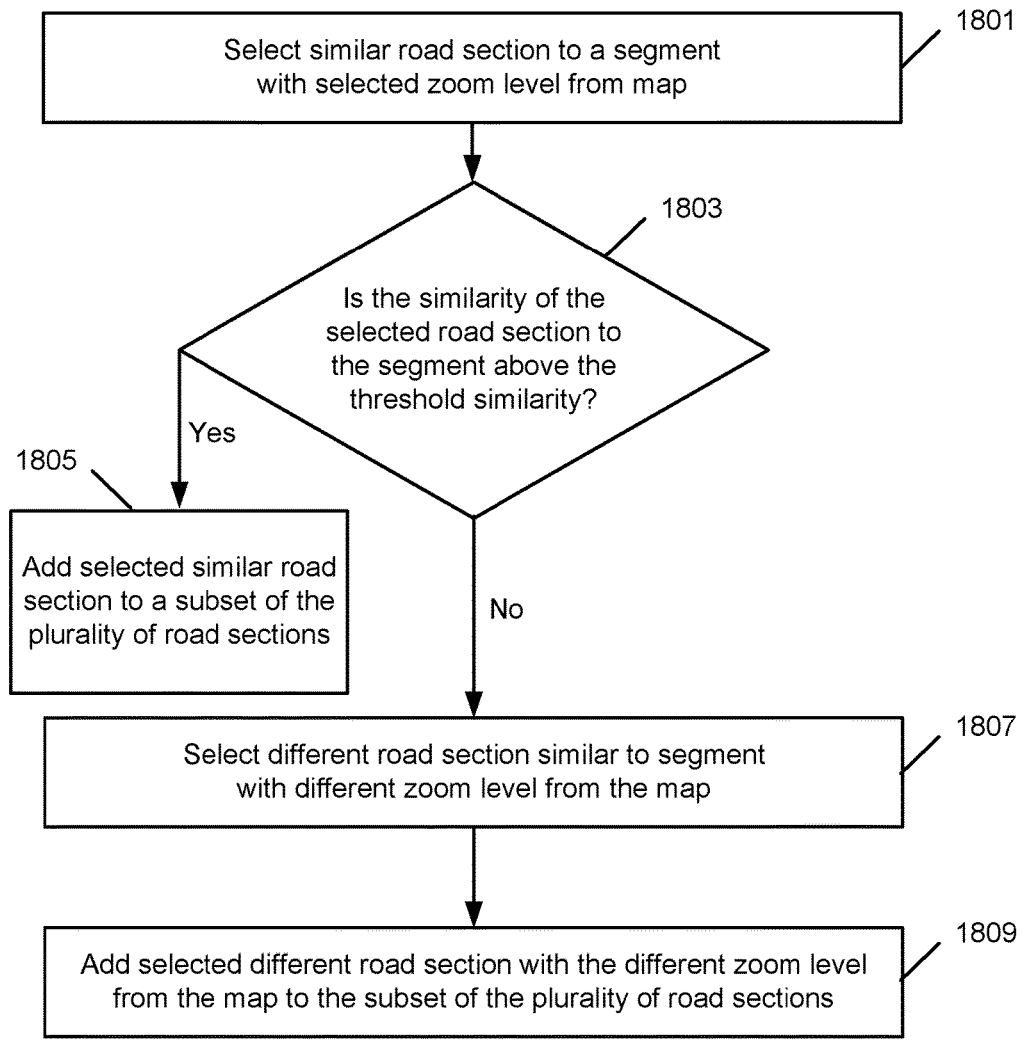
FIG. 18 is an operational flow of an implementation of a method for selecting a road section that is similar to a line segment.

FIG. 18 is an operational flow of an implementation of a method 1800 for selecting a road section that is similar to a line segment. The method 1800 may be implemented by the route engine 160.

At 1801, a road section with a selected zoom level that is similar to a segment is selected. The road section 167 may be selected from a plurality of road sections 167 of a map by the section engine 215 of the route engine 160. The selected road section 167 may have the same zoom level 135 as a currently selected zoom level 135 for the map. The segment 127 may be a segment of a line 125 drawn by a user on the map. The selected road section 167 may be the road section 167 that is most similar to the segment 127 and that also has an associated zoom level 135 that is equal to the selected zoom level 135.

At 1803, whether the similarity of the selected road section 127 to the segment 127 is above the threshold similarity is determined. The determination may be made by the section engine 215 of the route engine 160. The threshold similarity 217 may be set by a user or administrator. If the similarity of the selected road section 167 is above the threshold similarity 217, the method 1800 may continue at 1805. Otherwise, the method 1800 may continue at 1807.

At 1805, the selected similar road section is added to a subset of the plurality of road sections. The selected similar road section 167 may be added by the section engine 215 of the route engine 160. The subset of road sections 167 may be used to form the route 165.

At 1807, a different road section 167 that is similar to the segment with a different zoom level is selected from the map. The different road section 167 may be selected by the section engine 215 of the route engine 160. Because the previously selected road section 167 was not similar enough to the segment 127, the section engine 215 may "relax" the zoom level 135 to a different zoom level 135 that is either above or below the selected zoom level 135. The section engine 215 may then select a different road section 167 from the plurality of road sections 167 that is similar to the segment 127, but that is also associated with the different zoom level 135.

At 1809, the selected different road section is added to the subset of the plurality of road sections. The selected similar road section 167 may be added by the section engine 215 of the route engine 160. The subset of road sections 167 may be provided by the section engine 215 as the route 165

FIG. 19 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 19, an exemplary system for implementing aspects described herein includes a computing device, such as computing device 1900. In its most basic configuration, computing device 1900 typically includes at least one processing unit 1902 and memory 1904. Depending on the exact configuration and type of computing device, memory 1904 may be volatile (such as random access memory (RAM)), non-volatile (such as read-only memory (ROM), flash memory, etc.), or some combination of the two. This most basic configuration is illustrated in FIG. 19 by dashed line 1906.

Computing device 1900 may have additional features/functionality. For example, computing device 1900 may include additional storage (removable and/or non-removable) including, but not limited to, magnetic or optical disks or tape. Such additional storage is illustrated in FIG. 19 by removable storage 1908 and non-removable storage 1910.

Computing device 1900 typically includes a variety of computer readable media. Computer readable media can be any available media that can be accessed by the device 1900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1904, removable storage 1908, and non-removable storage 1910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1900.

Computing device 1900 may contain communication connection(s) 1912 that allow the device to communicate with other devices. Computing device 1900 may also have input device(s) 1914 such as a keyboard, mouse, pen, voice input device, touch input device, etc. Output device(s) 1916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for automatically selecting road sections for a line on a map based on a zoom level is provided. The system includes at least one computing device and a route engine. The route engine may be adapted to: receive a map comprising a plurality of road sections, wherein each road section is associated with a zoom level of a plurality of zoom levels; determine a zoom level of the plurality of zoom levels that is associated with the received map; receive a line, wherein the line has a placement on the map, and further wherein the line comprises an origin address and a destination address on the map; and based on the placement of the line on the map, select a subset of the plurality of road sections that forms a route between the origin address and the destination address, wherein each road section of the subset of the plurality of road sections is associated with the determined zoom level that is associated with the map.

Implementations may include some or all of the following features. The route engine adapted to receive the line may include the route engine adapted to receive user input on a display of the at least one computing device defining the line. The user input may be received from one or more of a stylus or a finger. The line may include a plurality of segments, and the route engine adapted to, based on the placement of the line on the map, select the subset of the plurality of road sections that forms the route between the origin address and the destination address, may include the route engine adapted to, for each segment of the plurality of segments: select a road section from the map that is similar to the segment with an associated zoom level that is equal to the determined zoom level; and add the selected similar road section to the subset of the plurality of road sections. The route engine may be further adapted to, for each segment of the plurality of segments: determine that a similarity of the segment and the selected similar road section for the segment is above a threshold similarity; and add the selected similar road section for the segment to the subset of the plurality of road sections when the similarity is above the threshold similarity. The route engine may be further adapted to, for each segment of the plurality of segments: determine that a similarity of the segment and the selected similar road section for the segment is not above a threshold similarity; in response to the determination, select a different road section from the map that is similar to the segment with an associated zoom level that is different than the determined zoom level; and add the selected different road section with the associated zoom level that is different than the determined zoom level to the subset of the plurality of road sections. The route engine may be further adapted to receive a selection of the zoom level of the plurality of zoom levels that is associated with the received map. Each zoom level of the plurality of zoom levels may represent a different road type of a plurality of road types. The road types of the plurality of road types may include one or more of freeways, highways, collectors, and local roads. The route engine may be further adapted to replace the line with the route formed by the selected subset of the plurality of road sections.

In an implementation, a system for automatically selecting road sections for a line on a map based on a zoom level is provided. The system may include at least one computing device and a route engine. The route engine may be adapted to: receive a map comprising a plurality of road sections, wherein each road section is associated with a zoom level of a plurality of zoom levels; receive a selection of a zoom level of the plurality of zoom levels for the received map; receive a first segment of a line on the map, wherein the first segment has a placement on the map; and based on the placement of the first segment on the map, select a road section of the plurality of road sections that is similar to the first segment, wherein the selected road section of the subset of the plurality of road sections is associated with the selected zoom level.

Implementations may include some or all of the following features. The route engine adapted to receive the first segment of the line on the map may include the route engine adapted to receive user input drawing the first segment of the line on the map. The user input may be received from one or more of a stylus or a finger. The route engine may be further adapted to: determine that a similarity of the selected similar road section to the first segment is not above a threshold similarity; and in response to the determination, select a different road section from the map that is similar to the first segment with an associated zoom level that is different than the selected zoom level. Each zoom level of the plurality of zoom levels may represent a different road type of a plurality of road types. The road types of the plurality of road types may include one or more of freeways, highways, collectors, and local roads. The route engine may be further adapted to replace the received first segment of the line on the map with the selected road section. The route engine may be further adapted to replace the received first segment of the line on the map with the selected road section before a second segment of the line on the map is received by the route engine.

In an implementation, a method for automatically selecting road sections for a line on a map based on a zoom level is provided. The method may include: receiving a map comprising a plurality of road sections by a computing device, wherein each road section is associated with a zoom level of a plurality of zoom levels; receiving a selection of a zoom level of the plurality of zoom levels for the received map by the computing device; receiving a line by the computing device, wherein the line has a placement on the map, and wherein the line comprises an origin address and a destination address on the map; based on the placement of the line on the map, selecting a subset of the plurality of road sections that forms a route between the origin address and the destination address by the computing device, wherein each road section of the subset of the plurality of road sections is associated with the selected zoom level for the received map; and replacing the line with the route formed by the selected subset of the plurality of road sections by the computing device.

Implementations may include some or all of the following features. The line may include a plurality of segments, and based on the placement of the line, selecting the subset of the plurality of road sections that forms the route between the origin address and the destination address, may include, for each segment of the plurality of segments: selecting a road section from the map that is similar to the segment with an associated zoom level that is equal to the selected zoom level; and adding the selected similar road section to the subset of the plurality of road sections.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for automatically selecting road sections for a line on a map based on a zoom level, the system comprising:
at least one computing device; and
a route engine adapted to:
determine a zoom level at which a user is viewing a subset of a map on a display, the map defining a plurality of road sections each being associated with one of a plurality of zoom levels from which the determined zoom level is selected;
receive a line, wherein the line has a placement on the map, and further wherein the line comprises a plurality of line segments connecting an origin address and a destination address on the map;
based on the placement of the line on the map, identify a subset of the plurality of road sections combinable to form a route between the origin address and the destination address; and
for each line segment of the plurality of line segments:
compare the line segment to a road section of the identified subset of the plurality of road sections;
determine whether a similarity between the line segment and the road section is above a threshold similarity; and
add the road section to a selected subset of the plurality of road sections responsive to the determination that the similarity is above the threshold similarity, wherein each road section of the selected subset of the plurality of road sections is associated with the determined zoom level with which the user is viewing the map.

2. The system of claim 1, wherein the route engine is adapted to receive user input on a display of the at least one computing device defining the line.

3. The system of claim 2, wherein the user input is received from one or more of a stylus or a finger.

4. The system of claim 1, wherein the route engine is further adapted to:
determine, for at least one line segment of the plurality of line segments, that the similarity between the line segment and the road section is not above the threshold similarity;
in response to the determination, select a different road section from the map that is similar to the line segment with an associated zoom level that is different than the determined zoom level; and
add the selected different road section with the associated zoom level that is different than the determined zoom level to the selected subset of the plurality of road sections.

5. The system of claim 1, wherein the route engine is adapted to receive a selection of the zoom level of the plurality of zoom levels that is associated with the map.

6. The system of claim 1, wherein each zoom level of the plurality of zoom levels represents a different road type of a plurality of road types.

7. The system of claim 6, wherein the road types of the plurality of road types comprise one or more of freeways, highways, collectors, and local roads.

8. The system of claim 1, wherein the route engine is further adapted to replace the line with the route formed by the selected subset of the plurality of road sections.

9. A system for automatically selecting road sections for a line on a map based on a zoom level, the system comprising:
at least one computing device; and
a route engine adapted to:
determine a zoom level at which a user is viewing a subset of a map on a display, the map defining a plurality of road sections each being associated with one of a plurality of zoom levels from which the determined zoom level is selected;
receive a first segment of a line on the map, wherein the first segment has a placement on the map; and
based on the placement of the first segment on the map, select a road section of the plurality of road sections, wherein the selected road section of the subset of the plurality of road sections is associated with the determined zoom level with which the user is viewing the map;
determine that a similarity of the selected road section to the first segment is not above a threshold similarity;
in response to the determination, select a different road section from the map that is similar to the first segment with an associated zoom level that is different than the determined zoom level.

10. The system of claim 9, wherein the route engine is adapted to receive user input drawing the first segment of the line on the map.

11. The system of claim 10, wherein the user input is received from one or more of a stylus or a finger.

12. The system of claim 9, wherein each zoom level of the plurality of zoom levels represents a different road type of a plurality of road types.

13. The system of claim 12, wherein the road types of the plurality of road types comprise one or more of freeways, highways, collectors, and local roads.

14. The system of claim 9, wherein the route engine is further adapted to replace the received first segment of the line on the map with the selected road section.

15. The system of claim 14, wherein the route engine is further adapted to replace the received first segment of the line on the map with the selected road section before a second segment of the line on the map is received by the route engine.

16. A method for automatically selecting road sections for a line on a map based on a zoom level, the method comprising:

determining a zoom level at which a user is viewing a subset of a map on a display of a computing device, the map defining a plurality of road sections each being associated with one of a plurality of zoom levels from which the determined zoom level is selected;

receiving a line by the computing device, wherein the line has a placement on the map, and wherein the line comprises a plurality of line segments connecting an origin address and a destination address on the map;

based on the placement of the line on the map, identifying a subset of the plurality of road sections combinable to form a route between the origin address and the destination address by the computing device; and for each line segment of the plurality of line segments:
        comparing the line segment to a road section of the identified subset of the plurality of road sections;
        determining whether a similarity between the line segment and the road section is above a threshold similarity; and
        adding the road section to a selected subset of the plurality of road sections responsive to the determination that the similarity is above the threshold similarity, wherein each road section of the selected subset of the plurality of road associated with the determined zoom level with which the user is viewing the map; and replacing the line with the route formed by the selected subset of the plurality of road sections by the computing device.

* * * * *